(12) United States Patent
Stahl et al.

(10) Patent No.: US 7,222,479 B2
(45) Date of Patent: May 29, 2007

(54) CURVED SUPPORT ARM FOR REEL ASSEMBLY

(75) Inventors: Martin Stahl, Krautheim (DE); Günter Kempf, Krautheim-Gommersdorf (DE)

(73) Assignee: Deere & Company, Moline, IL (US)

( * ) Notice: Subject to any disclaimer, the term of this patent is extended or adjusted under 35 U.S.C. 154(b) by 52 days.

(21) Appl. No.: 11/128,837

(22) Filed: May 14, 2005

(65) Prior Publication Data
US 2005/0262821 A1    Dec. 1, 2005

(30) Foreign Application Priority Data
May 15, 2004    (DE)    ...................... 10 2004 024 234

(51) Int. Cl.
*A01D 57/04* (2006.01)
(52) U.S. Cl. .......................... 56/221; 56/14.3; 56/14.4; 56/219; 56/220
(58) Field of Classification Search .................. 56/14.3
See application file for complete search history.

(56) References Cited

U.S. PATENT DOCUMENTS

| 4,008,558 | A |   | 2/1977  | Mott ............................ 56/226 |
| 4,800,711 | A |   | 1/1989  | Hurlburt et al. ............... 56/219 |
| 4,875,331 | A | * | 10/1989 | Ostrup et al. .................. 56/208 |
| 5,752,372 | A |   | 5/1998  | Buermann ............... 56/10.2 E |
| 5,768,868 | A | * | 6/1998  | Stein .......................... 56/14.5 |
| 6,029,429 | A |   | 2/2000  | Fot et al. ..................... 56/10.2 |
| 6,170,244 | B1 |   | 1/2001  | Coers et al. .................. 56/226 |
| 6,442,918 | B1 |   | 9/2002  | Fox ............................. 56/221 |
| 6,843,045 | B2 | * | 1/2005  | Bickel ......................... 56/14.4 |
| 2002/0148210 | A1 | * | 10/2002 | Bickel ........................ 56/14.4 |

FOREIGN PATENT DOCUMENTS

| AT | 396 860       | 12/1993 | .................... 41/14 |
| DE | 195 29 067    | 8/1995  |   |
| DE | 195 08 887    | 11/1995 |   |
| DE | 196 32 895 C2 | 2/1998  |   |
| EP | 1048199       | 4/2000  |   |
| GB | 1574033       | 4/1977  |   |
| WO | WO 03/049532  | 12/2001 |   |
| WO | WO 03/033304  | 10/2002 |   |

OTHER PUBLICATIONS

German Search Report, dated Nov. 16, 2006 (4 pages).

* cited by examiner

*Primary Examiner*—Thomas B. Will
*Assistant Examiner*—M. T. Nguyen

(57) ABSTRACT

A crop harvesting mechanism having a reel assembly with a reel that is rotatably supported at each end by a respective reel support. A reel carrier arm is provided for each of the reel supports and the supports are movable along the reel carrier arm. A horizontal adjustment actuator moves the reel support along the reel carrier arms over an adjustment range. The reel carrier arms are constructed with an upward or downward oriented curve, inside of the adjustment range over which the reel holding devices can be shifted by the actuator. The reel operates below a cutting bar in its forward position and in a position moved further back that is above and behind the cutting bar so that collisions are avoided.

5 Claims, 3 Drawing Sheets

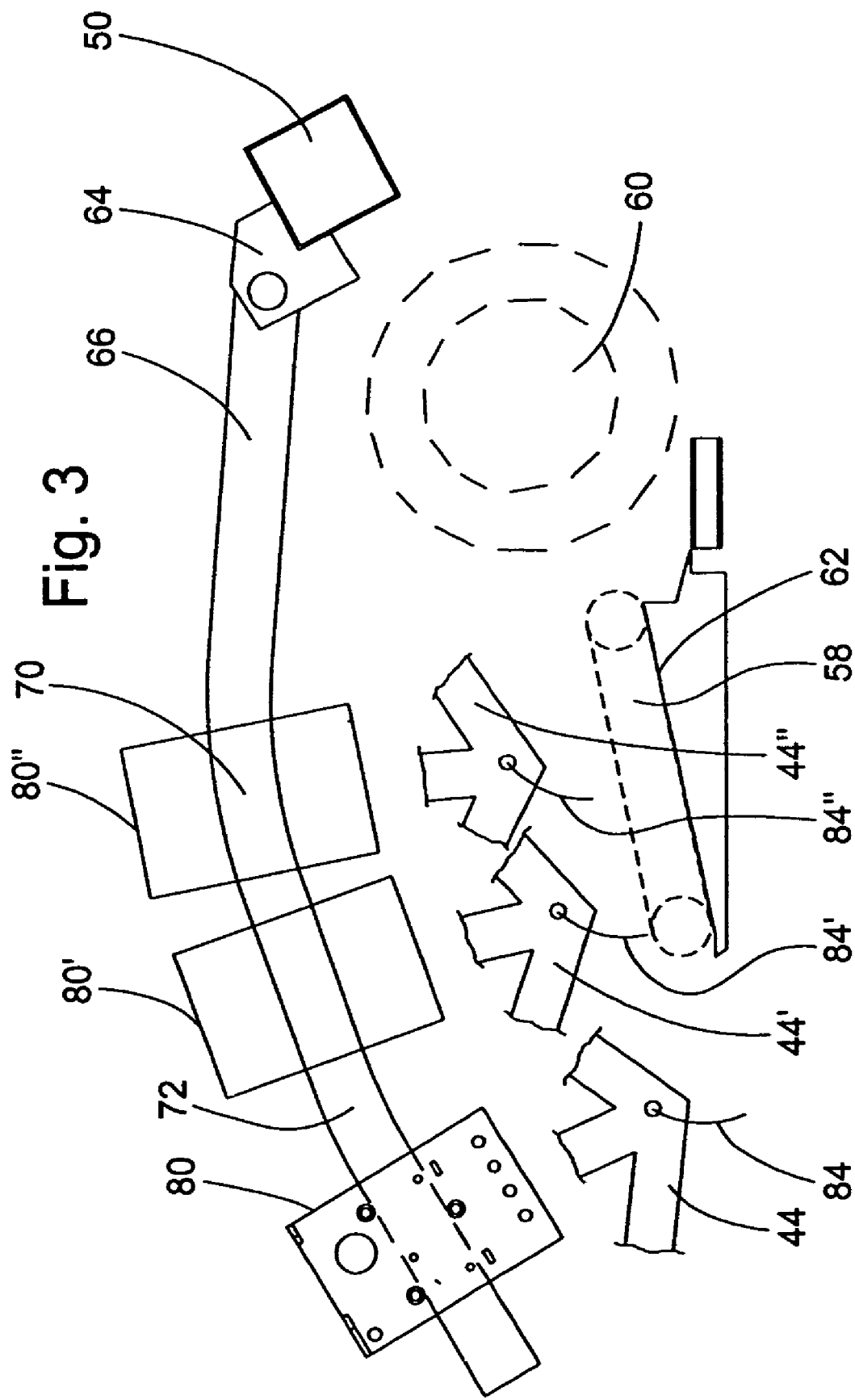

CURVED SUPPORT ARM FOR REEL ASSEMBLY

FIELD OF THE INVENTION

This invention relates to a harvesting mechanism with a reel assembly that is rotatably supported at each end on curved reel carrier arms. Each of the reel carrier arms is pivotably mounted. A horizontal adjustment actuator moves reel supports along the reel carrier arms to provide an enhanced adjustment range.

BACKGROUND OF THE INVENTION

Harvesting mechanisms are used for grain harvesting with self-propelled combines. They usually have a horizontally orientated cutter bar for cutting crop stalks and a transverse conveying auger that feeds the cut crop to the feederhouse of the combine. A pickup reel is located above and in front of the cutter bar to gather the crop to be harvested and to direct crop to the cutter bar and the transverse conveying auger. The pickup reel rotates around a longitudinal axis and is provided with horizontal tine carriers distributed around the longitudinal axis. The tine carriers carry tines that engage the crop stalks.

The reel is usually rotatably mounted on reel supports that are provided on reel carrier arms. The carrier arms are pivotably mounted behind the cutter bar on the frame of the harvesting mechanism and pivot around a horizontal axis transverse to the direction of forward movement. The angle of the reel carrier arm is adjusted by a hydraulic cylinder around the axis, and thus adjusts the height of the reel relative to ground level and the cutter bar. An additional hydraulic cylinder shifts the reel along the reel carrier arm. The position of the reel can thus be varied in the forward and backward direction.

The reel carrier arms are usually straight over their entire length, as shown in the prior art in GB 1 501 639 A, GB 1 574 033 A and WO 03/049532 A. Alternatively, reel carrier arms are provided with bends or angles. Usually the part of the reel carrier arm that cooperates with the reel support is straight, as shown in U.S. Pat. No. 4,800,711, U.S. Pat. No. 6,029,429, DE 195 08 887 C, and DE 195 29 067 A. Therefore, when the reel is shifted along the reel carrier arm, the reel moves in a straight line. The angle or slope of the reel carrier arm relative to the horizontal depends on the pivoting angle of the reel carrier arm around the horizontal axis.

Additionally, some harvesting mechanisms have a two part intake mechanism. A front bottom part carries the cutter bar and is movable in the forward direction. A rear bottom part is fixed solidly to the harvesting mechanism frame. In order to adapt the harvesting mechanism to a crop such as rapeseed, for example, the front bottom part is moved forward. Problems can arise in adjustment of the reel position because collisions between the reel and cutter bar are possible when the front bottom part is adjusted forward. Specifically collisions happen in the area of the cutter bar if the reel is adjusted forward or is lowered too far.

Thus, precautions are taken to prevent such collisions. In U.S. Pat. No. 4,800,711 a mechanical coupling is provided between the cutter bar and the reel carrier arm by a lever mechanism that automatically moves the reel carrier arm vertically as a function of the horizontal position of the cutter bar. A similar mechanical coupling between the reel carrier arm and cutter bar which has a radial cam and a guide roller is described in WO 03/049532 A. To prevent collisions of the reel with the cutter bar, DE 195 08 887 C provides an electronic coupling for positioning the cutting bar via a connection to a sensor that controls an actuator.

The known coupling between the position of the cutting bar and the vertical reel position is disadvantageous in that the operator cannot switch to certain reel positions in a manner that is easily known to him because certain reel positions are blocked mechanically or electronically. Furthermore, the above mechanical and electronic components are relatively expensive and are susceptible to fouling and damage.

Potential collisions between the reel and cutter bar also arises in other types of harvesting mechanisms, especially those with conveyor belts that transport the crop back to a transverse conveying auger which then feeds the crop to the feederhouse of a combine, as described in GB 1 501 639 A, GB 1 574 033 A and GB 1 602 067 A. A sufficiently long horizontal adjustment path of the reel is required to be able to move the reel far enough forward to receive laid crop, and also to be able to move the reel far enough backward for rapeseed harvest to press the crop mat under the transverse conveying auger. The reel should operate below the cutting bar in the forward position but not lie on the conveyor belt in the rear position. This problem could be resolved by a mechanical arrangement, similar to the previously described couplings between the position of the cutter bar and the vertical adjustable reel position, which automatically raises the reel arm when it is moved backward. However, this configuration also has the above-described shortcomings.

SUMMARY OF THE INVENTION

Therefore, the reel carrier arms of the present invention are not straight but are curved and angled upward and/or downward. The reel carrier arms are curved or bent in the adjustment region or assembled from straight parts that enclose an angle to increase the adjustment range.

Thus, during displacement of the reel support by the horizontal adjustment actuator in a manner defined by the curved arm, the reel is displaced not only along the reel carrier arm but also in a direction extending perpendicularly, upwards or downwards, to the direction of adjustment. The reel is moved by the horizontal adjustment actuator on a curved or angular path. The relationship between horizontal and vertical movement can be optimized for the specific circumstances of the harvesting mechanism so that undesirable collisions of the reel with the cutting mechanism parts can be avoided and the movement range of the reel can be optimized.

In particular, a suitable curved shape of the reel carrier arms can enable the reel to operate in its front position below a cutter bar. Additionally, the reel can be shifted further back and located at a relatively small distance above and behind the cutter bar. The vertical adjustment actuator of the reel defines the pivoting angle of the reel carrier arm around the horizontal axis in its lowest position. The curved shape of the carrier arm is particularly advantageous in harvesting mechanisms with conveyor belt assemblies downstream from the cutter bar, which transport the crop backward and feed it to a transverse auger. The curved shape can also be expedient in other harvesting machines, such as in embodiments with a movable cutter bar or in grain harvesting machines with fixed cutter bars that are not equipped with conveyor belts.

BRIEF DESCRIPTION OF THE DRAWINGS

FIG. 3 shows a partially cut-away side view of the harvesting mechanism, in which three different possible positions of the reel are indicated.

DETAILED DESCRIPTION OF THE INVENTION

Figure 1:
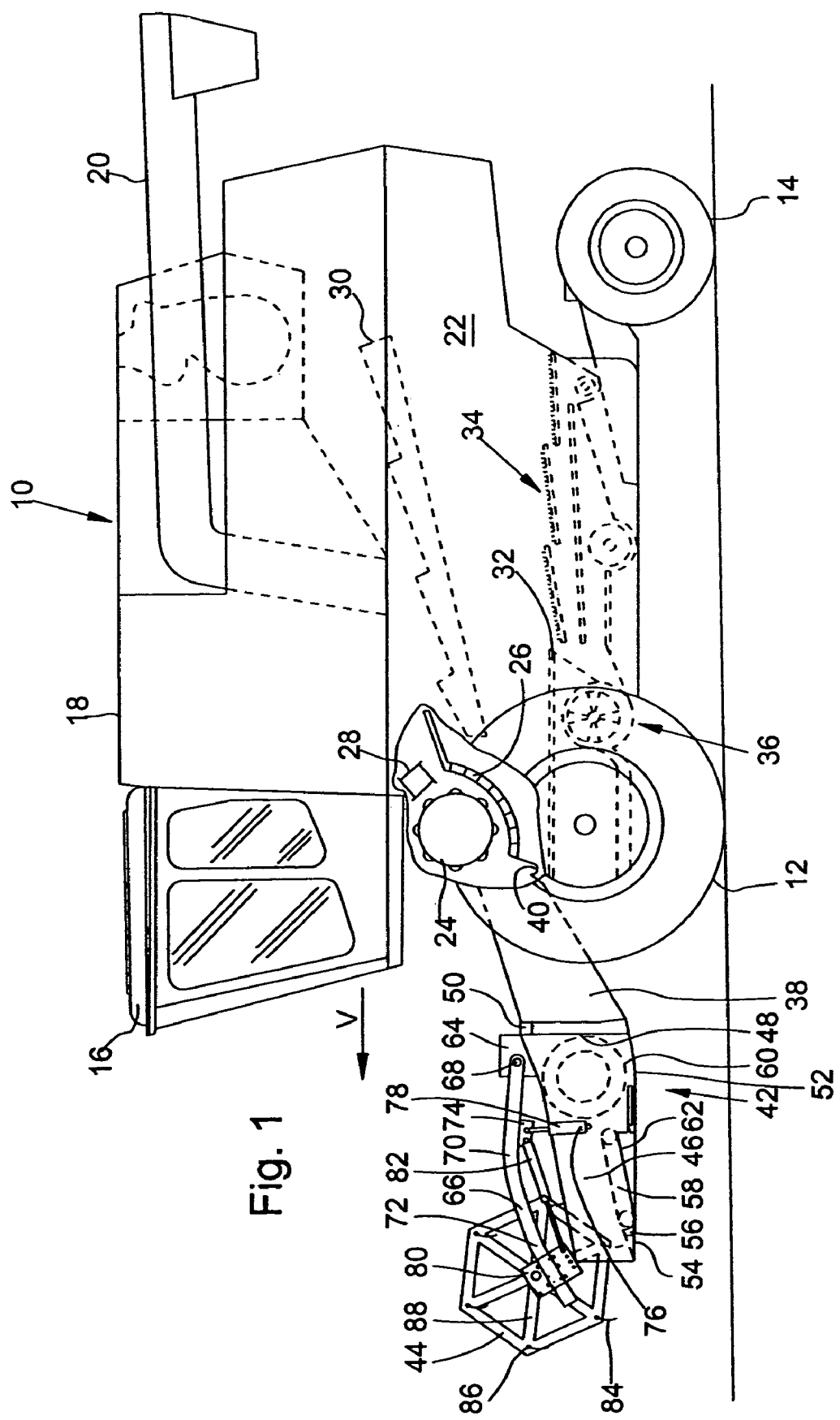
FIG. 1 shows a schematic side view of a combine with a harvesting mechanism according to the present invention.

An agricultural combine 10, shown in FIG. 1, is supported on front driven and rear steerable wheels 12 and 14, respectively. An operator cab 16 is provided from which the combine can be operated by a driver. A grain tank 18 is located to the rear of the operator cab and can discharge the grain deposited in it out through a discharge auger 20. The grain tank 18 is supported on a frame 22. The grain is broken down into its large and small constituents as it passes through a threshing cylinder 24, a threshing concave 26 and a stripper beater 28. A further separation of the harvested grain is effected on the shakers 30 connected thereto, and on a preparation pan 32 and sieve 34. The threshed grain is conveyed into the grain tank 18. The large portions of material other than grain are deposited on the ground by the shakers 30 and the light constituents are also blown onto the ground from the sieve 34 by a blower 36. After the crop lying or standing on the ground has been picked up by a harvesting or cutting mechanism 42, it is conveyed through a feederhouse 38 and a stone catching trough 40 to the threshing cylinder 24. For the description presented below, the directions specified such as front, behind, above and below are relative to the forward direction V of the combine 10.

The harvesting mechanism 42 includes a frame that is assembled of side walls 46, a back wall 48 with a cross beam 50 on its upper side, and a bottom 52. The middle region of the cross beam 50 is suspended detachably on the feederhouse 38 by suitable means such as hooks. A cutting bar 54 with reciprocating knives is located at the front edge of the bottom 52. Behind the cutter bar 54, relative to the forward direction V, is a ramp 56 extending over the width of the harvesting mechanism 42 and inclined slightly toward the rear. Lateral spurs or side cutting mechanisms are arranged on the front side of the side walls 46.

Behind the ramp 56 there are several conveyor belt assemblies 58 arranged laterally alongside each other with the conveyor direction moving rearward, opposite the forward direction V. A transverse auger 60 is provided behind the conveyor belts and runs transverse to the forward direction V. The transverse auger 60 includes an auger tube with spirals welded on the tube and controlled collecting fingers provided in the tube middle section. The conveyor belt assemblies 58 rise slightly toward the back. Bottom plates 62 adapted in shape to the conveyor belt assemblies 58 and the transverse auger 60 are located at the mechanism underside. A number of conveyor belt assemblies 58 are arranged laterally side by side and is dependent on the width of the harvesting mechanism 42.

Above the cutter bar 54 and the conveyor belt assemblies 58 is a driven and rotatable pickup reel 44 that is adjustable in height and movable in the forward and backward direction. The reel is located on the harvesting mechanism frame, and extends transverse to the forward direction V. On both lateral ends of the frame of the mechanism 42, a bracket 64 is welded on the front of the cross beam 50 and a reel carrier arm 66 is pivotably supported around a horizontal axis 68 running transverse to the forward direction V. The two reel carrier arms 66 are preferably identical or are mirror-symmetric across the longitudinal midplane.

The reel carrier arms 66 extend from the axis 68 initially straight forward and then, at about one-third of its length, bend downward in a first bend angle 70. Forward of the bend 70 in the forward direction V, the reel carrier arms 66 again extend straight forward and then bend downward, at about two-thirds of the arm length, in a second bend angle 72. The reel carrier arms 66 again extend straight forward of the second bend 72. As a result, the reel carrier arms 66 are somewhat bowed. In order to pivot reel carrier arm 66 about axis 68, a vertical adjustment actuator 78, such as a hydraulic cylinder, is positioned between an anchor device 76 located on the side wall 46 and a bracket 74 welded on the reel carrier arm 66 underneath the first bend 70. Means for adjusting the distance between the piston rod of the vertical adjusting actuator 78 and the bracket 74 are provided in a known manner.

The reel 44 is pivotably supported in a reel support 80 at both ends of curved arms 66. The reel support 80 is in turn movably supported on the reel carrier arm 66 forward of the bend 72. A horizontal adjustment actuator 82, such as another hydraulic cylinder, is provided between the reel support 80 and the bracket 74.

Figure 2:
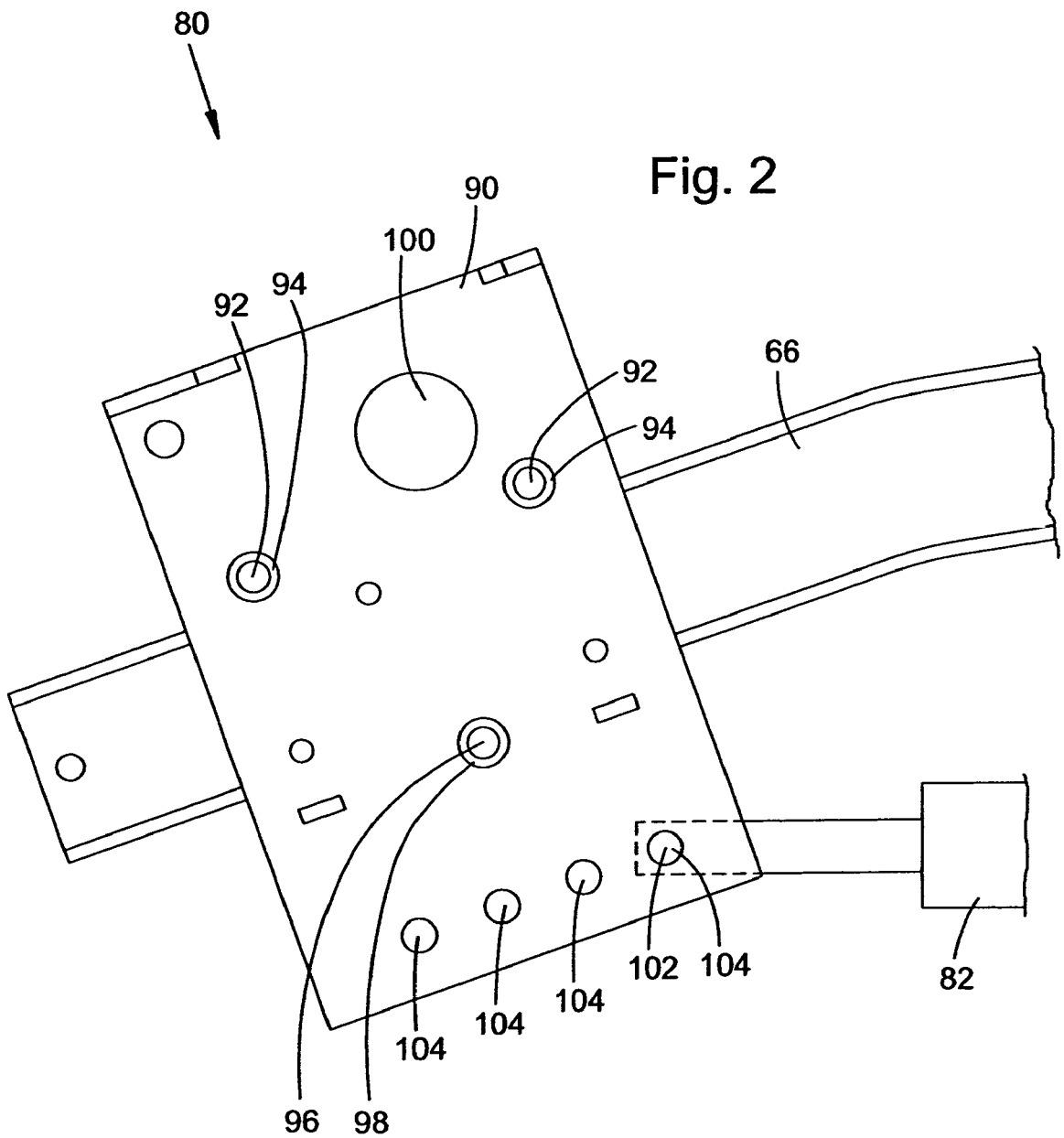
FIG. 2 shows an enlarged side view of the reel support on the curved reel carrier arm.

The reel support 80 is shown in an enlarged view in FIG. 2. The reel support 80 includes vertically running side plates 90 between which the reel carrier arm 66 is located. The side plates 90 are joined above the reel carrier arm 66 by two bolts 92, spaced apart in the forward direction. The bolts each rotatably support a hollow cylindrical roller 94, which rolls on the upper side of the curved reel carrier arm 66. An additional bolt 96 extends underneath the reel carrier arm 66 and carries another rotatable hollow cylindrical roller 98 that rolls on the underside of the reel carrier arm 66. Alternatively, two bolts 96 with rollers 98, one behind the other, could be provided on the underside of the reel carrier arm 66 to support the reel support 80 in a more stable manner. Thus the reel support 80 is movably supported on the reel carrier arm 66 by the rollers and 98. An opening 100 in the reel support 80 serves to support the axis of reel 44. The piston of the horizontal adjustment actuator 82 is connected to the support 80 by a bolt 102 extending between the side plates. The bolt 102 can be inserted into any one of four holes 104 at the bottom of the side plates 90. The adjustment range of the reel support 80 is thus extended for a given adjustment path of the horizontal adjustment actuator 82.

The reel 44 is equipped with six tine carriers 86 fastened on spiders 88. The tine carriers carry tines 84 arranged alongside each other. The position of the tine carrier and the tines 84 is varied by conventional control mechanisms during the rotation of the reel 44 so that the tines 84 always extend approximately downward and slightly backward from the tine carriers. A control mechanism can involve eccentric levers, as described in the U.S. Pat. No. 4,008,558, or cams running in cam tracks, as disclosed in EP 1 048 199 A.

The cam tracks or eccentric levers can be adjusted around the axis of the reel 44 to adjust the angular attitude of the tines 84 as required. The cam tracks or control elements for the eccentric lever do not rotate with the reel 44, and are thus fastened on the reel support 80, such as at a hole. The reel support 80 changes its orientation during its movement along the curved reel carrier arm 66 due to the carrier arm curvature 72. Thus, reel support 80 rotates around a horizontal axis oriented transverse to the forward direction V. Because the attitude of the tines 84 would thus change, a second support, which moves only between the curves 70 and 72 on the curved reel carrier arm 66 can be coupled with the support 80 and moves synchronously with it. The second support could be connected with the cam tracks or the control elements for the eccentric lever.

The reel support 80 and respective lower sections of the reel 44 are shown in three positions in the FIG. 3. In the frontmost position, in which the reel is designated by 44 and the reel support by 80, the reel 44 lies sufficiently far forward and the tines 84 are below the cutting bar 54 to pick up laid crop. At the rearmost position, in which the reel is designated by 44" and the reel support by 80", the reel 44" lies sufficiently far back to press the crop onto the transverse auger 60 when harvesting a crop such as rapeseed. In the middle position, the reel 44' is located above the conveyor belt assemblies 58.

The movement of the reel support 80 with the reel 44 effects a movement on a curved path along the curved reel carrier arm 66, which first runs steeply from the front to the back and then runs flatter beyond the bend 72. The shape of the reel carrier arm 66 is adapted to the cutting bar 54 and the conveyor belt assemblies 58.

The invention claimed is:

1. A crop harvesting mechanism having a reel assembly, the reel assembly comprising:
    a reel that is rotatably supported at each end by a respective reel support;
    two reel carrier arms, wherein each respective reel support is positioned on the reel carrier arms so as to be movable along each reel carrier arm;
    horizontal adjustment actuators for moving the respective reel support along the reel carrier arms over an adjustment range, wherein the reel carrier arms are curved along the adjustment range over which the reel support can be moved by the adjustment actuator.

2. The crop harvesting mechanism with a reel assembly according to claim 1, wherein the real carrier arms are curved angularly upward or downward.

3. The crop harvesting mechanism according to claim 1, further comprising a cutter bar wherein the reel carrier arms are shaped so that the reel is operated in a forward position below the cutter bar and is operated in a back position a short distance above and behind the cutter bar, wherein a vertical adjustment actuator of the reel defines a pivot angle of the reel carrier arm around the horizontal axis when it is in its lowest position.

4. The crop harvesting mechanism according to claim 3, further comprising conveyor belt assemblies that are located behind the cutting bar.

5. The crop harvesting mechanism according to claim 1 wherein the reel has tine carriers with a plurality of tines fastened on the tine carriers, so that the tine carriers cooperate with a position controller as a function of the angle of rotation of the reel, so that the controller enables a rotational position of the tines independent of the position of the horizontal adjustment actuator.

* * * * *